US011533083B2

(12) United States Patent
Eguchi

(10) Patent No.: US 11,533,083 B2
(45) Date of Patent: Dec. 20, 2022

(54) WIRELESS TRANSMISSION SYSTEM, CONTROL METHOD, AND STORAGE MEDIUM

(71) Applicant: CANON KABUSHIKI KAISHA, Tokyo (JP)

(72) Inventor: Tadashi Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/497,506

(22) Filed: Oct. 8, 2021

(65) Prior Publication Data
US 2022/0116078 A1 Apr. 14, 2022

(30) Foreign Application Priority Data
Oct. 14, 2020 (JP) .............................. JP2020-173313

(51) Int. Cl.
| | |
|---|---|
| *H04B 5/00* | (2006.01) |
| *H04B 5/02* | (2006.01) |
| *H01L 41/107* | (2006.01) |
| *H01L 41/22* | (2013.01) |
| *G02F 1/225* | (2006.01) |
| *H04L 7/00* | (2006.01) |

(52) U.S. Cl.
CPC ......... *H04B 5/0075* (2013.01); *H04B 5/0031* (2013.01); *H04L 7/0008* (2013.01)

(58) Field of Classification Search
None
See application file for complete search history.

(56) References Cited

U.S. PATENT DOCUMENTS

| | | | | |
|---|---|---|---|---|
| 4,238,733 A | * | 12/1980 | Freeman ................ | H02K 11/20 324/536 |
| 6,420,842 B1 | * | 7/2002 | Gold ...................... | H02K 55/04 318/141 |
| 6,441,699 B2 | * | 8/2002 | Yamada ................. | H01P 5/188 333/116 |
| 6,617,712 B1 | * | 9/2003 | Dondi ................... | G01D 5/2046 310/12.21 |
| 7,218,012 B1 | * | 5/2007 | Edenfeld ................ | F03D 9/25 290/55 |
| 7,248,994 B1 | * | 7/2007 | Stolan ................... | G01D 5/2291 324/207.16 |
| 7,663,462 B2 | * | 2/2010 | Makuth ................. | H01F 38/18 336/130 |

(Continued)

FOREIGN PATENT DOCUMENTS

| | | |
|---|---|---|
| JP | H0445505 A | 2/1992 |
| JP | 2015202415 A | 11/2015 |

*Primary Examiner* — Tuan A Tran
(74) *Attorney, Agent, or Firm* — Canon U.S.A., Inc. IP Division

(57) ABSTRACT

A second transmission path coupler has such a size that a signal width of a first signal that is generated by the second transmission path coupler at timings corresponding to a rising edge and a falling edge of an input signal to be input to a first transmission path coupler in a case where the input signal is transmitted to a position at which the first transmission path coupler and the second transmission path coupler perform an electric field and/or magnetic field coupling is substantially equal to or greater than a difference in a transmission delay amount corresponding to a gap of the first transmission path coupler.

14 Claims, 9 Drawing Sheets

(56) References Cited

U.S. PATENT DOCUMENTS

| | | | | |
|---|---|---|---|---|
| 8,041,225 B2* | 10/2011 | Hemmelmann | G08C 23/04 | |
| | | | 250/208.2 | |
| 8,369,780 B2* | 2/2013 | Bauer | H04B 5/00 | |
| | | | 307/104 | |
| 8,437,639 B2* | 5/2013 | Labonville | A61B 34/74 | |
| | | | 250/551 | |
| 9,209,570 B2* | 12/2015 | Toba | H01R 13/648 | |
| 9,312,925 B2* | 4/2016 | Kusaka | H04B 5/0031 | |
| 9,537,540 B2* | 1/2017 | Graf | H04B 5/0037 | |
| 9,778,014 B2* | 10/2017 | Hoglund | G01B 7/003 | |
| 9,859,994 B2* | 1/2018 | Steffens | H04B 17/27 | |
| 9,862,338 B2* | 1/2018 | Bauer | H02J 50/80 | |
| 10,093,491 B2* | 10/2018 | Tam | H01L 21/67144 | |
| 10,224,146 B2* | 3/2019 | Matsumoto | H01F 27/2804 | |
| 10,361,591 B2* | 7/2019 | Widmer | B60L 53/126 | |
| 10,483,805 B2* | 11/2019 | Kahlman | H02J 50/10 | |
| 10,558,104 B2* | 2/2020 | Williams | G02F 1/2257 | |
| 10,984,947 B2* | 4/2021 | Grünberg | H04B 5/0037 | |
| 11,057,078 B2* | 7/2021 | Tamaki | H04B 5/0012 | |
| 2010/0148505 A1* | 6/2010 | Dunlap | H01F 38/18 | |
| | | | 336/120 | |
| 2010/0285747 A1* | 11/2010 | Bauer | H01F 38/14 | |
| | | | 307/104 | |
| 2013/0134838 A1* | 5/2013 | Yun | H01L 41/047 | |
| | | | 29/25.35 | |
| 2016/0127052 A1* | 5/2016 | Steffens | H04B 17/16 | |
| | | | 455/67.14 | |
| 2017/0030741 A1* | 2/2017 | Lin | G01D 5/24 | |
| 2017/0361725 A1* | 12/2017 | Seong | H04B 5/0081 | |
| 2018/0334050 A1* | 11/2018 | Widmer | B60L 53/126 | |
| 2018/0340391 A1* | 11/2018 | Gray | H04B 5/0037 | |
| 2020/0328775 A1* | 10/2020 | Asai | H04B 1/38 | |

* cited by examiner

WIRELESS TRANSMISSION SYSTEM, CONTROL METHOD, AND STORAGE MEDIUM

BACKGROUND

Field

The present disclosure relates to a wireless transmission system including a movable transmission path.

Description of the Related Art

A technique for controlling an apparatus that includes a rotatable movable portion, such as a robot hand portion or a network camera, through communication via a network or the like has been under development. The apparatus including such a rotatable movable portion can be configured to perform data communication through the rotatable movable portion in order to prevent issues such as a cable becoming entangled around a shaft while the rotatable movable portion is rotated.

Japanese Patent Application Laid-Open No. 4-45505 discusses a configuration in which an electric signal is input from one end of a ring-shaped first transmission path and the other end of the first transmission path is terminated, and a signal output from a second transmission path that is opposed to the first transmission path is detected. In this case, if the electric signal is input from a first end of the first transmission path and is transmitted to a second end of the first transmission path, a timing when the electric signal reaches the first end deviates from a timing when the electric signal reaches the second end. In other words, the electric signal reaches the second end with a delay with respect to the first end due to a transmission delay on the first transmission path. Accordingly, on the second transmission path, the signal reception timing varies depending on which part of the first transmission path the signal is received from. To address this, Japanese Patent Application Laid-Open No. 4-45505 discusses a technique for correcting a signal timing deviation depending on the position of the second transmission path using a variable delay unit that is connected to the second transmission path. Specifically, when the second transmission path is located near the first end of the first transmission path, the delay amount of the variable delay unit is increased, and when the second transmission path is located near the second end of the first transmission path, the delay amount of the variable delay unit is decreased.

However, according to the technique discussed in Japanese Patent Application Laid-Open No. 4-45505, as illustrated in FIG. 6A, a gap between a first end A for inputting a signal from a first transmission path 101 and a terminated second end B is small. Accordingly, a second transmission path 111 can be opposed to both the first end A and the second end B of the first transmission path 101. FIG. 6B illustrates an edge signal of an input signal detected by the second transmission path 111 (reception coupler). When the second transmission path 111 is moved above the first end A and the second end B of the first transmission path 101, signals that are output from the first end A and the second end B of the first transmission path 101 at different timings are combined as illustrated in FIG. 6B. Accordingly, temporal "skipping" occurs in the signal output from the second transmission path, and if the temporal "skipping" exceeds a permissible jitter amount of a digital circuit, erroneous data may be output.

To address the above-described issue, Japanese Patent Application Laid-Open No. 2015-202415 discusses a method for establishing a stable communication while preventing data skipping by appropriately selecting and switching a plurality of sending-side transmission paths (send coupler) and receiving-side transmission paths (reception coupler).

However, in the method discussed in Japanese Patent Application Laid-Open No. 2015-202415, there is a need for routing an input channel signal to (N+1) transmission lines through a delay unit depending on a position of a rotatable movable portion relative to a fixed portion. Accordingly, a relative position detection unit and a switch unit for switching the input signal at a high speed are required, and thus the configuration thereof becomes complicated.

SUMMARY

In view of the above-described issues, various embodiments of the present disclosure are directed to preventing destabilization of communication with a simple configuration when signals are transmitted using a first transmission path coupler including a gap and a second transmission path coupler that is opposed to the first transmission path coupler in a non-contact state.

According to one embodiment of the present disclosure, a wireless transmission system includes a first transmission path coupler including transmission lines configured to transmit a signal, one end of each of the transmission lines being connected to a send unit, another end of each of the transmission lines being connected to a terminating resistor, the first transmission path coupler being annularly disposed, and a second transmission path coupler including transmission lines configured to transmit a signal, one end of each of the transmission lines being connected to a comparator, another end of each of the transmission lines being connected to a terminating resistor, the second transmission path coupler being configured to be moved across a gap of the first transmission path coupler. The second transmission path coupler generates a first signal at timings corresponding to a rising edge and a falling edge of an input signal input to the first transmission path coupler in a case where the input signal is transmitted to a position at which the first transmission path coupler and the second transmission path coupler perform an electric field and/or magnetic field coupling, a signal width of the first signal being substantially in proportion to a length of the electric field and/or magnetic field coupling of the first transmission path coupler and the second transmission path coupler. The signal width of the first signal is substantially equal to or greater than a difference in a transmission delay amount of the first transmission path coupler.

Further features of the present disclosure will become apparent from the following description of example embodiments with reference to the attached drawings.

DESCRIPTION OF THE EMBODIMENTS

Example embodiments of the present disclosure will be described in detail below with reference to the accompanying drawings. It will be understood that components described in the following example embodiments are merely example features, and the present invention is not limited to the illustrated components.

Figure 7:
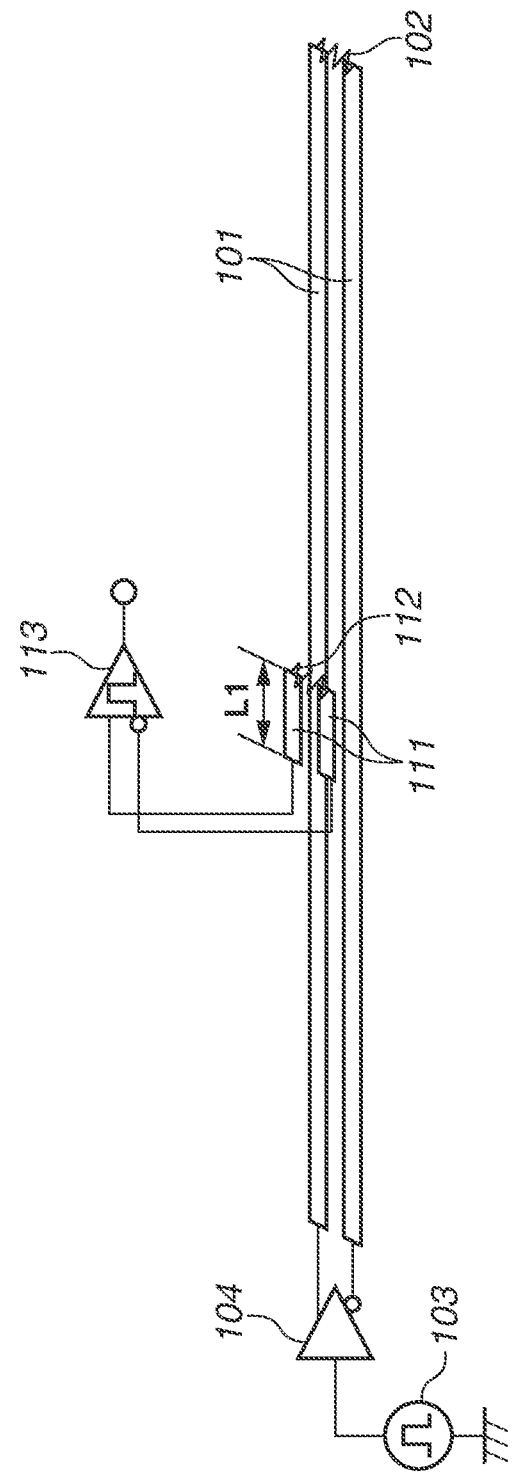
FIG. 7 is a system configuration diagram used to explain a principle common to the example embodiments.

Initially, a principle common to example embodiments of the present disclosure will be described. FIG. 7 is a system configuration diagram for illustrating the principle common to the example embodiments. A transmission path coupler 101 includes a pair of signal lines and serves as a sending-side transmission path coupler for differential signals. The transmission path coupler 101 is hereinafter referred to as a send coupler 101. Data transmitted from a signal source 103 (transmission unit) that is connected to the send coupler 101 is input to the send coupler 101 as differential signals through a differential send buffer 104 that is connected to the signal source 103 (hereinafter also referred to as a differential buffer 104). An end of the send coupler 101 that is opposite to the end connected to the signal source 103 is terminated by a terminating resistor 102 that is substantially equal to a transmission path characteristic impedance.

A transmission path coupler 111 includes a pair of signal lines and serves as a receiving-side transmission path coupler for differential signals. The transmission path coupler 111 is hereinafter referred to as the reception coupler 111. The reception coupler 111 is movable along the send coupler 101. The reception coupler 111 is coupled to the send coupler 101 by an effect of at least one of an electric field and a magnetic field. An input signal input from the signal source 103 is output from one end of the reception coupler 111 to a waveform shaping circuit 113 through an electric field and/or magnetic field coupling between the send coupler 101 and the reception coupler 111. The waveform of the input signal is shaped by the waveform shaping circuit 113, and the input signal is detected as a received signal. The other end of the reception coupler 111 is terminated by a terminating resistor 112 that is substantially equal to the transmission path characteristic impedance.

The send coupler 101 and the reception coupler 111 each operate as a directional coupler. An end of the reception coupler 111 that corresponds to the end of the send coupler 101 that is connected to the signal source 103 is referred to as a coupled end, and the other end of the reception coupler 111 is referred to as an isolation end.

Figure 8:
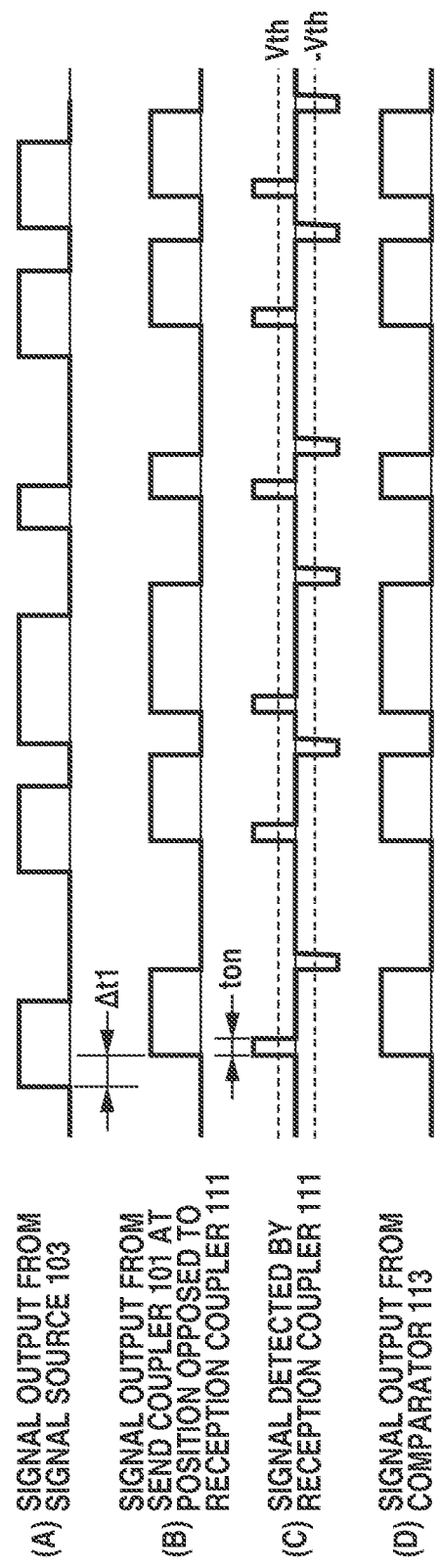
FIG. 8 depicts four timing diagrams (A) through (D) that are used to explain a principle common to the example embodiments.

FIG. 8 depicts four timing diagrams (A) though (D) illustrating a principle common to the example embodiments. Timing diagram (A) of FIG. 8 illustrates a signal that is output from the signal source 103, i.e., a signal that is input to the send coupler 101. Timing diagram (B) of FIG. 8 illustrates a signal that is output from the send coupler 101 at a position opposed to the reception coupler 111. Timing diagram (C) of FIG. 8 illustrates a signal that is output from the coupled end in a case where the isolation end of the reception coupler 111 is terminated and the signal is output from the coupled end. Timing diagram (D) of FIG. 8 illustrates a signal that is output from the waveform shaping circuit 113.

As illustrated in the timing diagrams (A)-(D) of FIG. 8, the signal transmitted through the send coupler 101 and the signal detected by the reception coupler 111 are differential signals. However, for simplicity of illustration, the differential signals are illustrated as single-ended signals corresponding to the differential signals.

The signal output from the signal source 103, as illustrated in timing diagram (A) of FIG. 8, is input to the send coupler 101 through the differential buffer 104. The signal transmitted on the send coupler 101 is transmitted at a transmission mode speed on a substrate, and is absorbed in the terminating resistor 102, which is substantially equal to the characteristic impedance of the send coupler 101.

Here, if the terminating resistor 102 completely matches the characteristic impedance of the send coupler 101, the signal transmitted at a terminal end is not reflected and is absorbed in the terminating resistor 102.

In such a case, the signal, on the send coupler 101, at the position opposed to the reception coupler 111 becomes the signal as illustrated in timing diagram (B) of FIG. 8. The signal as illustrated in timing diagram (B) of FIG. 8 lags behind the input signal by a period Ali, which is the sum of a delay in the differential buffer 104 and a transmission delay.

The signal detected by the reception coupler 111, as illustrated in timing diagram (C) of FIG. 8, rises in response to a rising edge of the signal illustrated in timing diagram (B) of FIG. 8, and then the rising edge of the signal illustrated in timing diagram (C) of FIG. 8 is held for a period that is substantially in proportion to the length of the electric field and/or magnetic field coupling between the send coupler 101 and the reception coupler 111. In other words, the rising edge of the signal illustrated in timing diagram (C) of FIG. 8 is held for a period that is substantially in proportion to the length of the reception coupler 111. In this case, the rising edge of the signal illustrated in timing diagram (C) of FIG. 8 is held for a period ton which is substantially in proportion to a length L1 of the reception coupler 111 illustrated in FIG. 7. After that, the signal illustrated in timing diagram (C) of FIG. 8 becomes substantially "0".

Further, the signal illustrated in timing diagram (C) of FIG. 8 falls in response to a falling edge of the signal illustrated in timing diagram (B) of FIG. 8, and the falling edge of the signal illustrated in timing diagram (C) of FIG. 8 is also held for the period ton. After that, the signal illustrated in timing diagram (C) of FIG. 8 becomes substantially "0".

The waveform shaping circuit 113 demodulates the input signal from the output signal from the reception coupler 111. The waveform shaping circuit 113 is generally configured with a comparator provided with a hysteresis so that "1" is output when the signal illustrated in timing diagram (C) of FIG. 8 (edge signal) detected by the reception coupler 111 is more than or equal to a positive threshold voltage Vth and "0" is output when the signal illustrated in timing diagram (C) of FIG. 8 is less than or equal to a negative threshold voltage −Vth. The waveform shaping circuit 113 is hereinafter referred to as the comparator 113.

In the signal illustrated in timing diagram (C) of FIG. 8, a reflected wave due to a small difference between the characteristic impedance of the send coupler 101 and the impedance of the terminating resistor 102, a reflected wave due to a mismatch in the reception coupler 111, and the like may occur as noise signals. However, if the noise signals are within the range of the above-described threshold voltages (Vth, −Vth), an output of the waveform shaping circuit 113 does not vary depending on the noise signal. The output of the waveform shaping circuit 113 varies depending only on the rising edge and falling edge of the signal illustrated in timing diagram (C) of FIG. 8. Thus, the terminating resistor 112 can demodulate the signal illustrated in timing diagram (D) of FIG. 8 that has the same waveform as the waveform of the signal illustrated in timing diagram (B) of FIG. 8.

Figure 9:
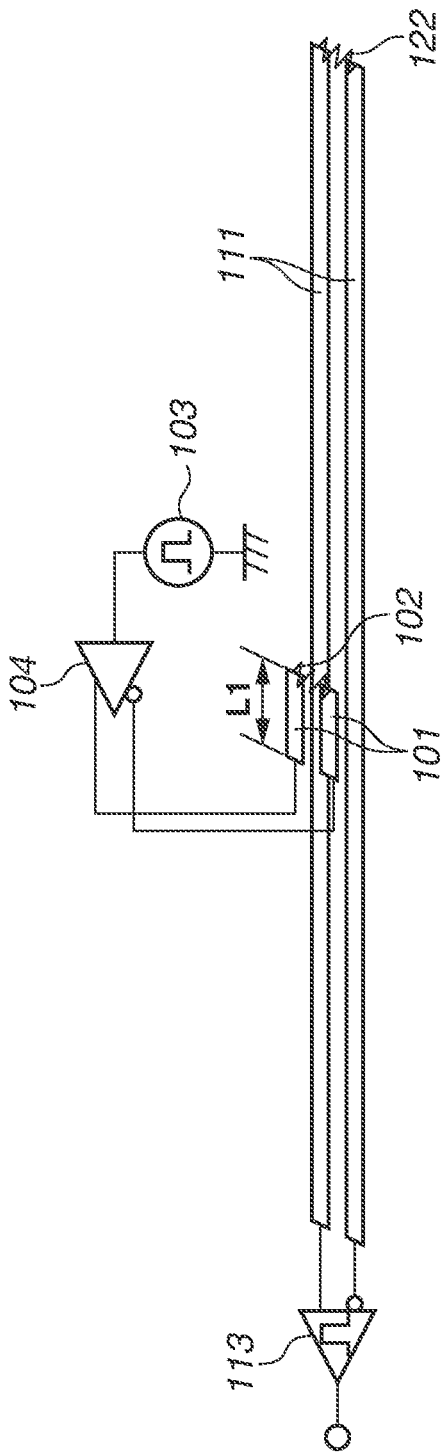
FIG. 9 is another system configuration diagram used to explain the principle common to the example embodiments.

While FIG. 7 illustrates an example where a long transmission path is used as the send coupler 101 and a short transmission path that is movable along the long transmission path is used as the reception coupler 111, the present invention is not limited to this example. Since the directional coupler has reversibility, similar advantageous effects can be obtained even when the send coupler 101 and the reception coupler 111 are replaced as illustrated in FIG. 9. Each component included in a system configuration diagram illustrated in FIG. 9 corresponds to the component denoted by the same reference numeral in the system configuration diagram illustrated in FIG. 7.

Figure 1:
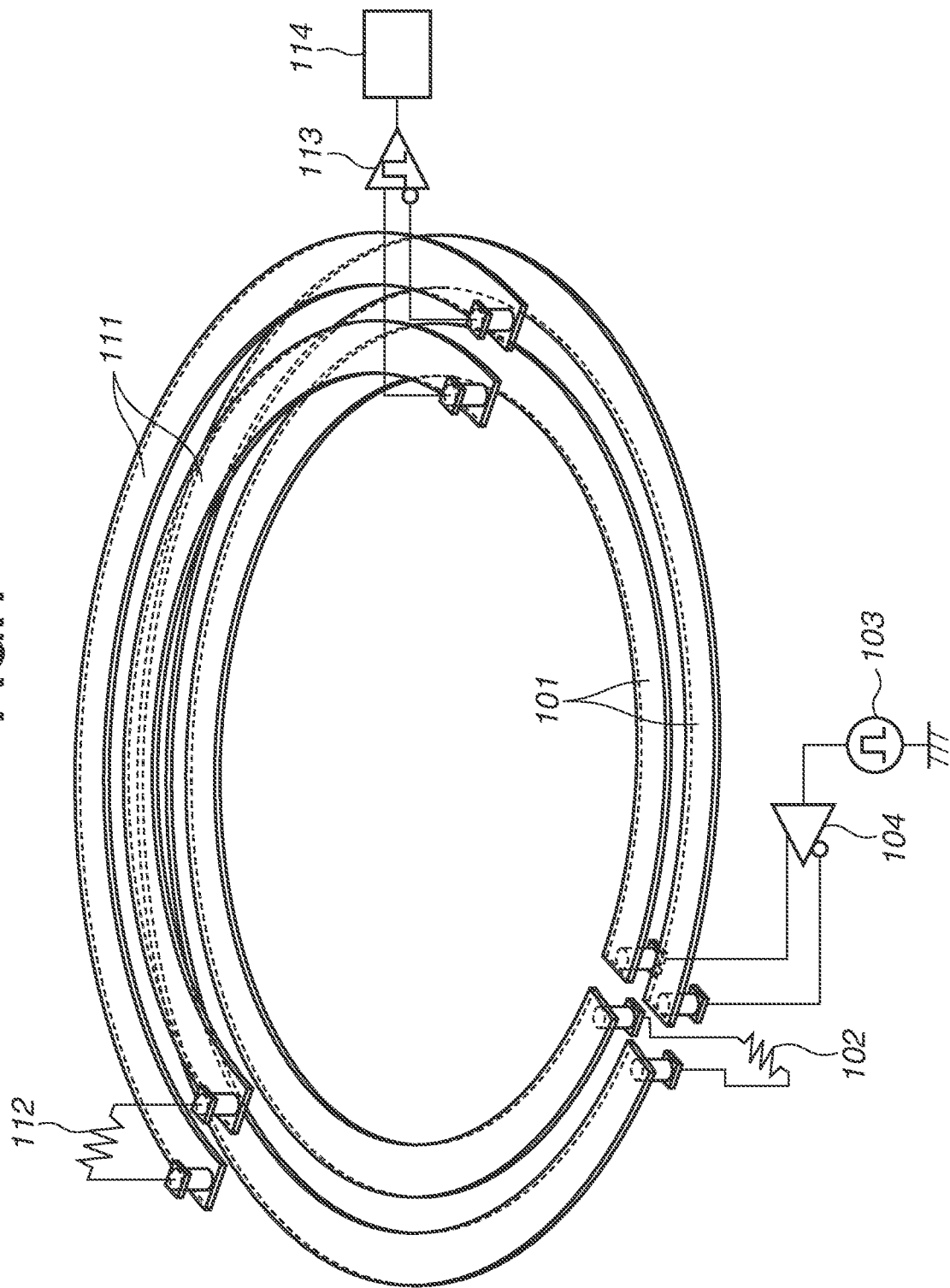
FIG. 1 illustrates a configuration example of a system according to a first example embodiment.

A first example embodiment of the present disclosure will be described next. FIG. 1 illustrates a configuration example of a wireless transmission system according to the present example embodiment. In the wireless transmission system according to the present example embodiment, the send coupler 101 is annularly disposed on the circumference of a circle. The reception coupler 111 is configured to be moved on the circumference of the circle along the send coupler 101. The reception coupler 111 outputs a signal from the coupled end.

In a case where the wireless transmission system according to the present example embodiment is disposed in an apparatus including a rotatable member, the send coupler 101 is disposed on the circumference of a circle about a rotational axis of the rotatable member. The reception coupler 111 is disposed such that the reception coupler 111 is opposed to the send coupler 101 and is movable on the circumference of the circle about the rotational axis of the rotatable member. The reception coupler 111 may be disposed on the outside or inside of the rotatable member. The send coupler 101 and the reception coupler 111 communicate signals through the electric field and/or magnetic field coupling. In FIG. 1, the illustration of members such as a substrate that supports the send coupler 101 and the reception coupler 111, and ground conductors used when differential high-frequency transmission paths, such as microstrip lines or coplanar lines, are used as the send coupler 101 and the reception coupler 111 is omitted to simplify the description.

FIG. 1 illustrates a configuration example in which the transmission path coupler 101 functions as a send coupler and the transmission path coupler 111 functions as a reception coupler. However, the present invention is not limited to this example. The transmission path coupler 101 may function as a reception coupler and the transmission path coupler 111 may function as a send coupler.

The send coupler 101 and the reception coupler 111 may be included in the same apparatus, or may be included in different apparatuses.

In a case where an output signal obtained from the reception coupler 111 is smaller than a desired signal level, an amplifier may be disposed between the reception coupler 111 and the comparator 113.

The send coupler 101 is a transmission path including a pair of conductors and is annularly disposed on the circumference of a circle. The send coupler 101 has a gap. One end of the send coupler 101 is connected to the signal source 103 through the differential buffer 104. The other end of the send coupler 101 is connected to the terminating resistor 102. A signal output from the signal source 103 is transmitted toward the terminating resistor 102 via the send coupler 101, and flows into the terminating resistor 102.

The reception coupler 111 is disposed such that the reception coupler 111 is opposed to the send coupler 101 on the circumference of the circle having the same center as that of the circumference on which the send coupler 101 is disposed. The reception coupler 111 is also a transmission path including a pair of conductors, and is formed with a length shorter than the send coupler 101. The reception coupler 111 is disposed such that the reception coupler 111 can be coupled to the send coupler 101 through the electric field and/or magnetic field coupling, and is configured to generate a signal based on an electric signal flowing through the send coupler 101.

The isolation end of the reception coupler 111 is terminated by the terminating resistor 112. The coupled end of the reception coupler 111 is connected to the comparator 113. The comparator 113 shapes the waveform of the signal received by the reception coupler 111, and transmits the signal to a digital circuit 114 which is connected to the comparator 113.

Here, the gap of the send coupler 101 is formed with a size that is smaller than the size of the reception coupler 111. When the reception coupler 111 is opposed to the send coupler 101 with the gap interposed therebetween, the reception coupler 111 is electric-field and/or magnetic-field coupled to the both ends of the send coupler 101 at the same time. In this case, the reception coupler 111 receives both a signal with almost no delay from the input signal that is input to the send coupler 101, and a signal that lags behind the input signal due to a transmission delay on the send coupler 101. The reception coupler 111 receives a signal obtained by combining these two signals according to the ratio of coupling between the reception coupler 111 and the transmission paths at two ends of the send coupler 101.

Figure 2A:
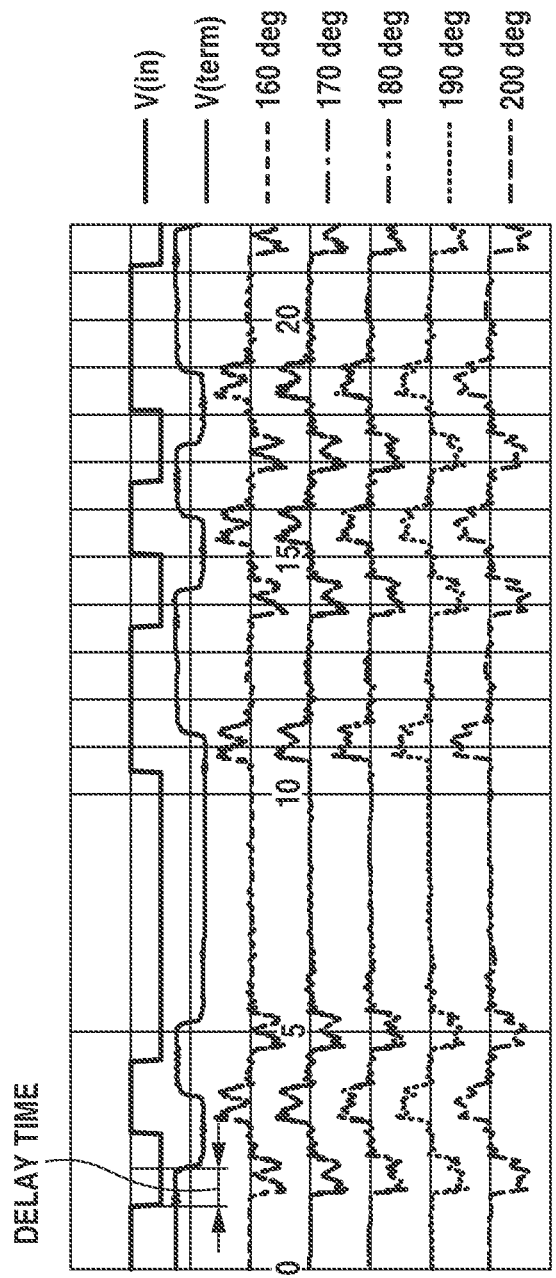
FIGS. 2A and 2B are timing diagrams used to determine the size of a reception coupler according to the first example embodiment.
Figure 2B:
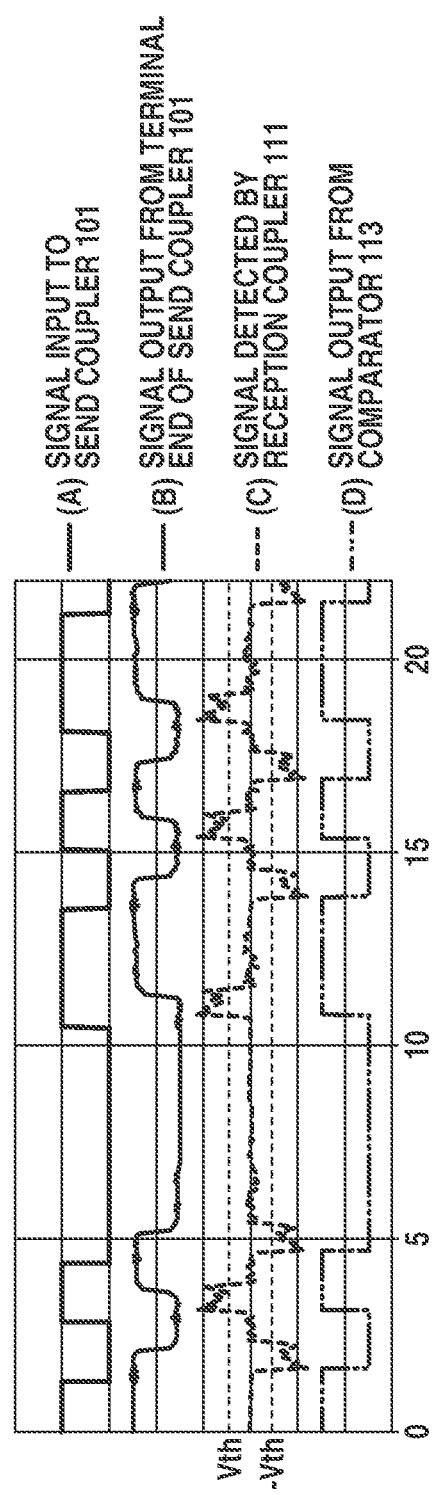

FIGS. 2A and 2B are timing diagrams used to determine the size of the reception coupler 111. FIG. 2A illustrates a waveform of an input signal V(in) input to the send coupler 101, a waveform of a signal V(term) output from the terminal end of the send coupler 101, and a waveform of an output signal output from the coupled end of the reception coupler 111 for each angle of the arc of the reception coupler 111 in this order from top. FIGS. 2A and 2B illustrate the waveform of the output signal when the angle of the arc of the reception coupler 111 is 160 degrees, 170 degrees, 180 degrees, 190 degrees, and 200 degrees. When the angle of the arc of the reception coupler 111 is more than or equal to 180 degrees of the circumference of the circle, the signal width of the output signal from the reception coupler 111 is greater than a delay time of the signal V(term) with respect to the input signal of the send coupler 101, so that the output signal from the reception coupler 111 has no discontinuity.

In the reception coupler 111 according to the present example embodiment, when the angle of the arc of the reception coupler 111 is 160 degrees or more and less than 180 degrees, the discontinuity of the received signal is 0.1 nanoseconds (ns) or less. Thus, since there are almost no comparators that can respond to such a small discontinuity, the output signal from the comparator 113 has no discontinuity.

Here, if a signal is transmitted at a speed of, for example, 1 Gbps, the maximum basic frequency of the signal is 500 MHz. On the other hand, if the received signal has a discontinuity of 0.1 ns, the basic frequency component of the signal is 5 GHz. In such a case, a low-pass filter (LPF) which passes the basic frequency of the signal and controls frequency components at the discontinuity is disposed between the reception coupler 111 and the comparator 113, thus preventing the occurrence of a discontinuity in the output signal from the comparator 113 even when the discontinuity is present. To simplify the configuration, a capacitor of about a few pH may be disposed as the LPF in parallel between the outputs of differential transmission paths of the reception coupler 111 to filter the signal. In this case, the discontinuity of the signal is decreased, so that no discontinuity occurs in the output signal from the comparator 113 even when the angle of the arc is less than or equal to 180 degrees. Similarly, if the maximum frequency at which the comparator 113 can respond is higher than the maximum basic frequency of the signal and is lower than the frequency component at the discontinuity, no discontinuity occurs in the output signal from the comparator 113.

The occurrence of a discontinuity in the signal can be prevented depending on the LPF disposed or the maximum response frequency of the comparator 113. However, when the reception coupler 111 is moved above the gap of the send coupler 101, a phase shift occurs in the received signal. This phase shift is to be prevented from exceeding a permissible jitter amount of the digital circuit 114 that is connected to the reception coupler 111.

FIG. 2B is a timing diagram illustrating a case where the angle of the arc of the reception coupler 111 is 180 degrees of the circumference of the circle. FIG. 2B illustrates an input signal (A) that is input to the send coupler 101, a signal (B) that is output from the terminal end of the send coupler 101, a signal (C) that is output from the reception coupler 111, and a signal (D) that is output from the comparator 113 in this order from top.

As illustrated in FIG. 2B, the signal width ton of the signal (C) is substantially equal to a delay amount td of the signal (B) with respect to the signal (A). Accordingly, it can be seen that the signal (D) has no discontinuity. As seen from FIG. 2B, data skipping in the signal output from the comparator 113 is controlled by appropriately setting the size of the reception coupler 111.

Figure 3A:
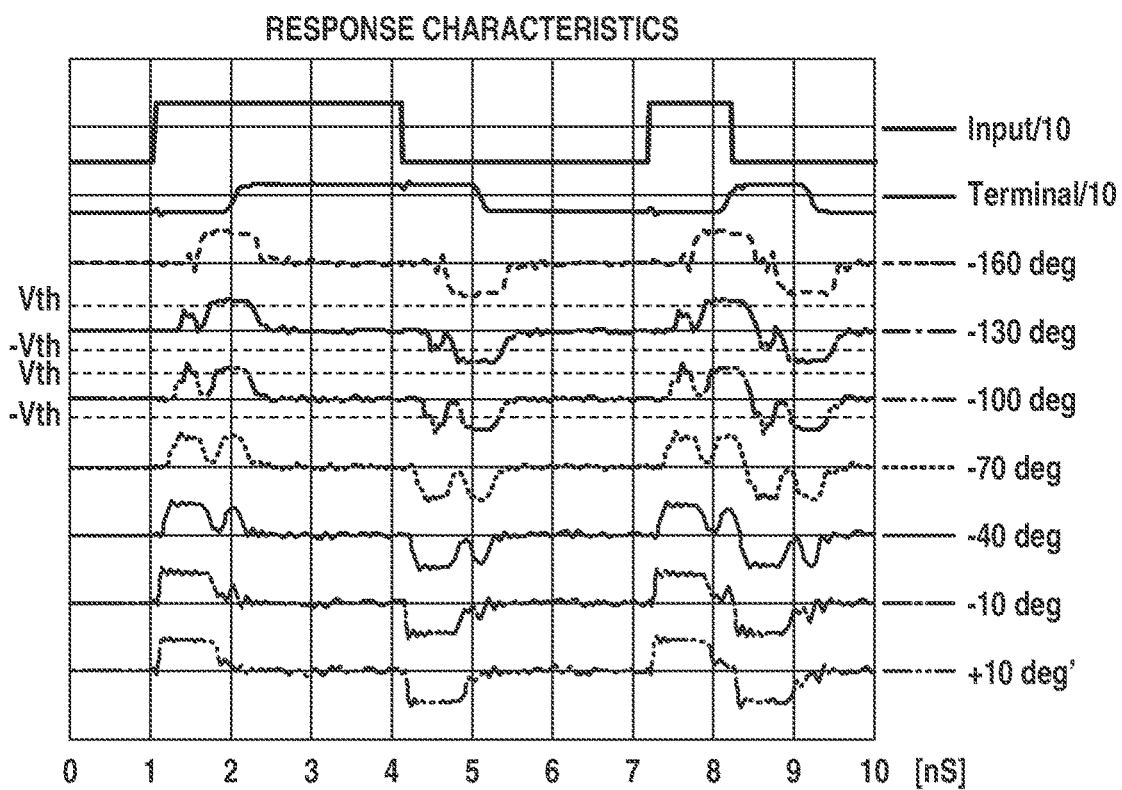
FIGS. 3A and 3B are timing diagrams illustrating a case where the reception coupler according to the first example embodiment is moved along the circumference of a send coupler.
Figure 3B:
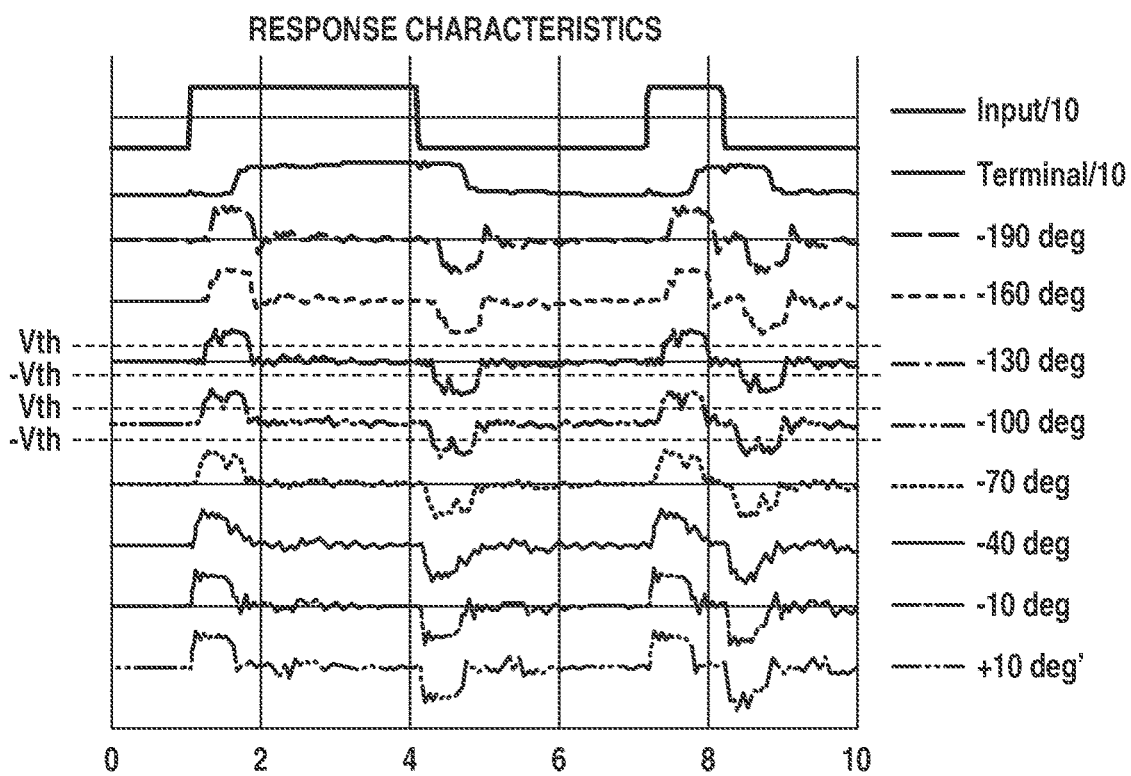

FIGS. 3A and 3B are timing diagrams illustrating a case where the reception coupler 111 is moved along the circumference of the send coupler 101. FIG. 3A illustrates a case where the angle of the arc of the reception coupler 111 is 150 degrees, and FIG. 3B illustrates a case where the angle of the arc of the reception coupler 111 is 180 degrees.

FIGS. 3A and 3B each illustrate an input signal that is input to the send coupler 101, a signal that is output from the terminal end of the send coupler 101, and an output signal that is output from the reception coupler 111 at each relative angle between the send coupler 101 and the reception coupler 111 in this order from top.

FIG. 3A illustrates the waveform of the output signal from the reception coupler 111 when the relative angle is −160 degrees, −130 degrees, −100 degrees, −70 degrees, −40 degrees, −10 degrees, and 10 degrees. The reception coupler 111 mainly receives signals in the vicinity of the terminal end of the send coupler 101 when the relative angle between the reception coupler 111 and the send coupler 101 is −130 degrees. In this case, the threshold voltages Vth and −Vth of the comparator 113 are reached at timings corresponding to a rising edge and a falling edge that are affected by the delayed signal (signal at the terminal end) of the send coupler 101. Accordingly, the output signal from the comparator 113 is output as the signal lagging behind the input signal that is input to the send coupler 101.

The reception coupler 111 mainly receives signals in the vicinity of the end to which the signal from the send coupler 101 is input when the relative angle between the reception coupler 111 and the send coupler 101 is −100 degrees. In this case, the output signal from the comparator 113 is output with almost no effect of the signal (signal at the terminal end) with a delay due to a transmission delay on the send coupler 101. Accordingly, in a case where the relative angle between the reception coupler 111 and the send coupler 101 is changed from −130 degrees to −100 degrees, the signal output from the comparator 113 is changed from the signal that is affected by the signal with a delay due to a transmission delay on the send coupler 101 to the signal that is not affected by the signal. In this case, skipping occurs at timings corresponding to a rising edge and a falling edge of the signal output from the comparator 113.

In a case where the reception coupler 111 is reversely rotated with respect to the send coupler 101, the angle of the reception coupler 111 relative to the send coupler 101 is changed from −100 degrees to −130 degrees. In this case, since the signal output from the comparator 113 is changed from the signal that is not affected by the signal with a delay due to a transmission delay on the send coupler 101 to the signal that is affected by the signal, skipping occurs at timings corresponding to a rising edge and a falling edge of the signal output from the comparator 113.

FIG. 3B illustrates the waveform of the output signal from the reception coupler 111 when the relative angle is −190 degrees, −160 degrees, −130 degrees, −100 degrees, −70 degrees, −40 degrees, −10 degrees, and 10 degrees. As illustrated in FIG. 3B, the timings when the thresholds Vth and −Vth are exceeded in the case where the relative angle between the reception coupler 111 and the send coupler 101 is −130 degrees is substantially equal to that in the case where the relative angle is −100 degrees. Accordingly, even in a case where the relative angle between the reception coupler 111 and the send coupler 101 is changed from −130 degrees to −100 degrees, skipping does not occur at timings corresponding to a rising edge and a falling edge of the signal output from the comparator 113.

As described above, the size of the reception coupler 111 is set to be substantially equal to the signal width of the signal output from the reception coupler 111 and the delay amount of the output signal at the terminal end with respect to the input signal to be input to the send coupler 101, thus preventing skipping in the signal output from the comparator. Thus, data skipping on the receiving side can be prevented.

A second example embodiment of the present disclosure will be described below. While the first example embodiment uses the system configuration as illustrated in FIG. 1, the present invention is not limited to this configuration. The size of the reception coupler 111 can be determined in a similar manner in system configurations other than the above-described system configuration.

Figure 4:
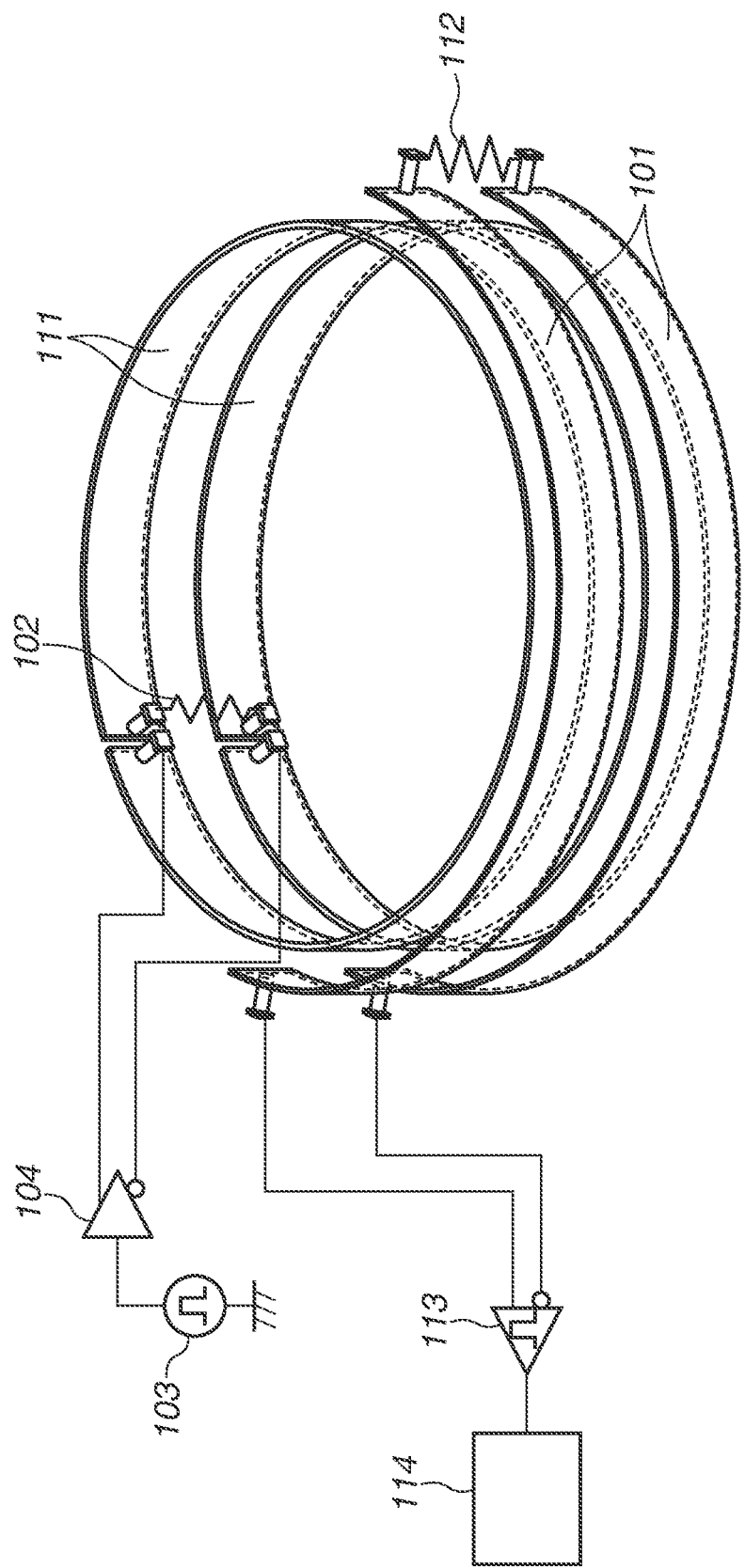
FIG. 4 illustrates a configuration example of a system according to a second example embodiment.

FIG. 4 illustrates a configuration example of a wireless transmission system different from the wireless transmission system according to the first example embodiment. In the configuration example illustrated in FIG. 4, the send coupler 101 is disposed on a side surface of a cylinder, and the reception coupler 111 is disposed on the outside of the cylinder such that the reception coupler 111 is opposed to the send coupler 101. In this system configuration, the reception coupler 111 has such a size that the signal width of the output signal from the reception coupler 111 is substantially equal to the delay amount of the output signal at the terminal end with respect to the input signal to be input to the send coupler 101, as in the first example embodiment. The configuration of the reception coupler 111 is not limited to this configuration. The reception coupler 111 may be configured as a coupler having a size large enough to hold a signal for a long period of time. In the system illustrated in FIG. 4, the send coupler 101 formed in a cylindrical shape includes differential transmission paths with the same length, and thus the differential transmission paths are more easily aligned in phase than in the system according to the first example embodiment, and the reflection at the terminal end can be reduced.

Figure 5:
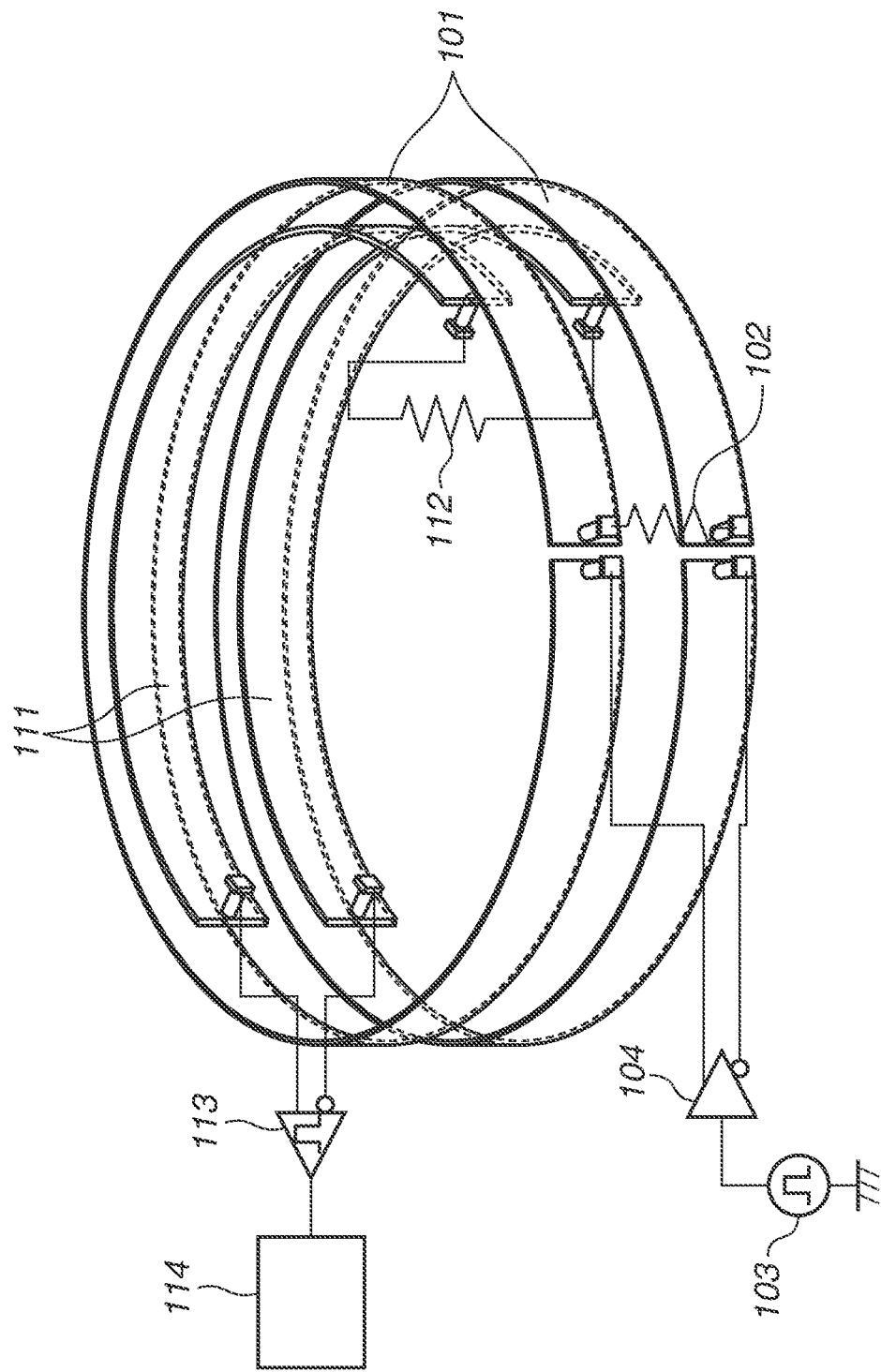
FIG. 5 illustrates a configuration example of another system according to the second example embodiment.
Figure 6:
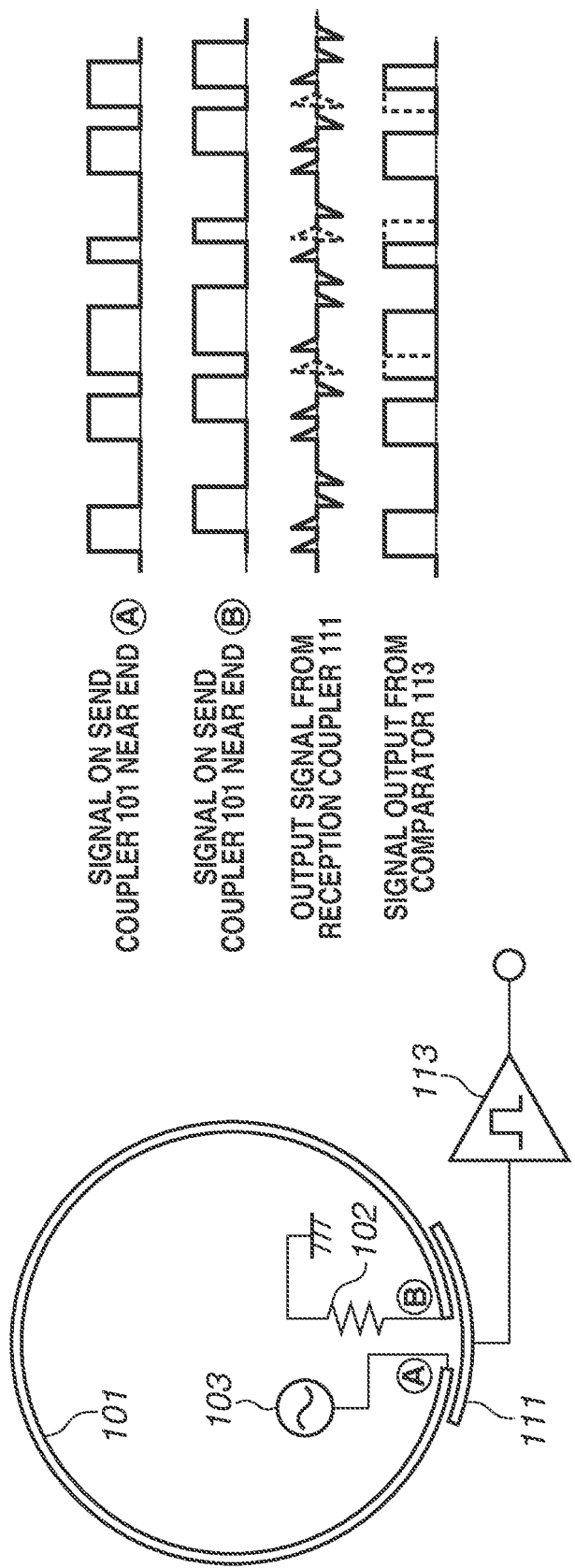
FIG. 6A is a configuration diagram for illustrating a system according to a related art.
FIG. 6B is a timing diagram of the system according to the related art.

FIG. 5 illustrates a configuration example of another wireless transmission system different from the wireless transmission system according to the first example embodiment.

Unlike the system illustrated in FIG. 4, the system illustrated in FIG. 5 has a configuration in which the reception coupler 111 is disposed on the inside of the send coupler 101. As in the system illustrated in FIG. 4, the reception coupler 111 has such a size that the signal width of the output signal from the reception coupler 111 is substantially equal to the delay amount of the output signal at the terminal end with respect to the input signal to be input to the send coupler 101. However, the configuration of the reception coupler 111 is not limited to this configuration. The reception coupler 111 may be configured as a coupler having a size large enough to hold a signal for a long period of time.

As described above, also in the system configuration illustrated in the second example embodiment, data skipping can be controlled by appropriately determining the size of the reception coupler 111, as in the first example embodiment.

In a practical circuit, the digital circuit 114 includes a permissible jitter amount tj. Accordingly, the reception coupler 111 may be configured to have such a size that skipping within a range smaller than the permissible jitter amount tj can occur. Specifically, it is only required that the delay amount td of the output signal at the terminal end with respect to the input signal to be input to the send coupler 101 and the signal width ton of the output signal from the reception coupler 111 satisfy tj<ton−td.

The wireless transmission systems according to the first and second example embodiments may be configured not only to communicate wireless signals, but also to transmit power. Instead of the transmission paths for sending and receiving differential signals according to the first and second example embodiments, a single transmission line may be used in other embodiments.

According to various embodiments of the present disclosure, it is possible to prevent destabilization of communication with a simple configuration when signals are transmitted using a first transmission path coupler including a gap and a second transmission path coupler that is opposed to the first transmission path coupler in a non-contact state.

Other Embodiments

Various embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2020-173313, filed Oct. 14, 2020, which is hereby incorporated by reference herein in its entirety.

What is claimed is:

1. A wireless transmission system comprising:
   a first transmission path coupler including transmission lines configured to transmit a signal, one end of each of the transmission lines being connected to a send unit, another end of each of the transmission lines being connected to a terminating resistor, the first transmission path coupler being annularly disposed; and
   a second transmission path coupler including transmission lines configured to transmit a signal, one end of each of the transmission lines being connected to a comparator, another end of each of the transmission lines being connected to a terminating resistor, the second transmission path coupler being configured to be moved across a gap of the first transmission path coupler,
   wherein the second transmission path coupler generates a first signal at timings corresponding to a rising edge and a falling edge of an input signal input to the first transmission path coupler in a case where the input signal is transmitted to a position at which the first transmission path coupler and the second transmission path coupler perform an electric field and/or magnetic field coupling, a signal width of the first signal being substantially in proportion to a length of the electric field and/or magnetic field coupling of the first transmission path coupler and the second transmission path coupler, and
   wherein the signal width of the first signal is substantially equal to or greater than a difference in a transmission delay amount of the first transmission path coupler.

2. The wireless transmission system according to claim 1, wherein an angle of an arc of the second transmission path coupler is more than or equal to 180 degrees and less than or equal to 200 degrees.

3. The wireless transmission system according to claim 1, wherein the second transmission path coupler further includes a low-pass filter connected to the second transmission path coupler, and
wherein an angle of an arc of the second transmission path coupler is more than or equal to 160 degrees and less than 180 degrees.

4. The wireless transmission system according to claim 1, wherein the comparator shapes a waveform of an input signal.

5. The wireless transmission system according to claim 4, wherein the comparator shapes the waveform by switching an output depending on whether the input signal is more than or equal to a first threshold or the input signal is less than or equal to a second threshold different from the first threshold.

6. The wireless transmission system according to claim 1, wherein, in a case where the second transmission path coupler is opposed to the first transmission path coupler with the gap interposed therebetween, the second transmission path coupler receives a signal obtained by combining a signal without a delay behind the input signal input to the first transmission path coupler and a signal with a delay corresponding to a transmission on the first transmission path coupler behind the input signal input to the first transmission path coupler.

7. A method for controlling a wireless transmission system, the wireless transmission system comprising:
a first transmission path coupler including transmission lines configured to transmit a signal, one end of each of the transmission lines being connected to a send unit, another end of each of the transmission lines being connected to a terminating resistor, the first transmission path coupler being annularly disposed; and
a second transmission path coupler including transmission lines configured to transmit a signal, one end of each of the transmission lines being connected to a comparator, another end of each of the transmission lines being connected to a terminating resistor, the second transmission path coupler being configured to be moved across a gap of the first transmission path coupler,
the method comprising:
generating, by the second transmission path coupler, a first signal at timings corresponding to a rising edge and a falling edge of an input signal input to the first transmission path coupler in a case where the input signal is transmitted to a position at which the first transmission path coupler and the second transmission path coupler perform an electric field and/or magnetic field coupling, a signal width of the first signal being substantially in proportion to a length of the electric field and/or magnetic field coupling of the first transmission path coupler and the second transmission path coupler; and
inputting the generated first signal to the comparator,
wherein the signal width of the first signal is substantially equal to or greater than a difference in a transmission delay amount corresponding to the gap of the first transmission path coupler.

8. A non-transitory computer-readable storage medium storing instructions that, when executed by a computer, cause the computer to perform a method for controlling a wireless transmission system, the wireless transmission system comprising:
a first transmission path coupler including transmission lines configured to transmit a signal, one end of each of the transmission lines being connected to a send unit, another end of each of the transmission lines being connected to a terminating resistor, the first transmission path coupler being annularly disposed; and
a second transmission path coupler including transmission lines configured to transmit a signal, one end of each of the transmission lines being connected to a comparator, another end of each of the transmission lines being connected to a terminating resistor, the second transmission path coupler being configured to be moved across a gap of the first transmission path coupler,
the method comprising:
generating, by the second transmission path coupler, a first signal at timings corresponding to a rising edge and a falling edge of an input signal input to the first transmission path coupler in a case where the input signal is transmitted to a position at which the first transmission path coupler and the second transmission path coupler perform an electric field and/or magnetic field coupling, a signal width of the first signal being substantially in proportion to a length of the electric field and/or magnetic field coupling of the first transmission path coupler and the second transmission path coupler; and
inputting the generated first signal to the comparator,
wherein the signal width of the first signal is substantially equal to or greater than a difference in a transmission delay amount corresponding to the gap of the first transmission path coupler.

9. A wireless transmission system comprising:
a first transmission path coupler including transmission lines configured to transmit a signal, one end of each of the transmission lines being connected to a send unit, another end of each of the transmission lines being connected to a terminating resistor, the first transmission path coupler being annularly disposed; and
a second transmission path coupler including transmission lines configured to transmit a signal, one end of each of the transmission lines being connected to a comparator, another end of each of the transmission lines being connected to a terminating resistor, the second transmission path coupler being configured to be moved across a gap of the first transmission path coupler,
wherein the second transmission path coupler further includes a circuit configured to control a frequency component at a discontinuity of a signal that occurs when the second transmission path coupler is moved across the gap of the first transmission path coupler, and to pass a maximum basic frequency of a signal input to the first transmission path coupler.

10. A method for controlling a wireless transmission system, the wireless transmission system comprising:
a first transmission path coupler including transmission lines configured to transmit a signal, one end of each of the transmission lines being connected to a send unit, another end of each of the transmission lines being connected to a terminating resistor, the first transmission path coupler being annularly disposed; and
a second transmission path coupler including transmission lines configured to transmit a signal, one end of each of the transmission lines being connected to a comparator, another end of each of the transmission lines being connected to a terminating resistor, the second transmission path coupler being configured to be moved across a gap of the first transmission path coupler, the second transmission path coupler further including a circuit configured to control a frequency component at a discontinuity of a signal that occurs when the second transmission path coupler is moved across the gap of the first transmission path coupler, and to pass a maximum basic frequency of a signal input to the first transmission path coupler, the method comprising:

generating, by the second transmission path coupler, a first signal at timings corresponding to a rising edge and a falling edge of an input signal input to the first transmission path coupler in a case where the input signal is transmitted to a position at which the first transmission path coupler and the second transmission path coupler perform an electric field and/or magnetic field coupling, a signal width of the first signal being substantially in proportion to a length of the electric field and/or magnetic field coupling of the first transmission path coupler and the second transmission path coupler; and inputting the generated first signal to the comparator.

11. A non-transitory computer-readable storage medium storing instructions that, when executed by a computer, cause the computer to perform a method for controlling a wireless transmission system, the wireless transmission system comprising:

a first transmission path coupler including transmission lines configured to transmit a signal, one end of each of the transmission lines being connected to a send unit, another end of each of the transmission lines being connected to a terminating resistor, the first transmission path coupler being annularly disposed; and a second transmission path coupler including transmission lines configured to transmit a signal, one end of each of the transmission lines being connected to a comparator, another end of each of the transmission lines being connected to a terminating resistor, the second transmission path coupler being configured to be moved across a gap of the first transmission path coupler, the second transmission path coupler further including a circuit configured to control a frequency component at a discontinuity of a signal that occurs when the second transmission path coupler is moved across the gap of the first transmission path coupler, and to pass a maximum basic frequency of a signal input to the first transmission path coupler, the method comprising:

generating, by the second transmission path coupler, a first signal at timings corresponding to a rising edge and a falling edge of an input signal input to the first transmission path coupler in a case where the input signal is transmitted to a position at which the first transmission path coupler and the second transmission path coupler perform an electric field and/or magnetic field coupling, a signal width of the first signal being substantially in proportion to a length of the electric field and/or magnetic field coupling of the first transmission path coupler and the second transmission path coupler; and inputting the generated first signal to the comparator.

12. A wireless transmission system comprising:

a first transmission path coupler including transmission lines configured to transmit a signal, one end of each of the transmission lines being connected to a send unit, another end of each of the transmission lines being connected to a terminating resistor, the first transmission path coupler being annularly disposed; and a second transmission path coupler including transmission lines configured to transmit a signal, one end of each of the transmission lines being connected to a comparator, another end of each of the transmission lines being connected to a terminating resistor, the second transmission path coupler being configured to be moved across a gap of the first transmission path coupler, wherein the second transmission path coupler generates a first signal at timings corresponding to a rising edge and a falling edge of an input signal input to the first transmission path coupler in a case where the input signal is transmitted to a position at which the first transmission path coupler and the second transmission path coupler perform an electric field and/or magnetic field coupling, a signal width of the first signal being substantially in proportion to a length of the electric field and/or magnetic field coupling of the first transmission path coupler and the second transmission path coupler, and wherein the second transmission path coupler has such a size that a value obtained by subtracting a transmission delay amount corresponding to the gap of the first transmission path coupler from the signal width of the first signal is substantially equal to or greater than a permissible jitter amount of a digital circuit configured to receive a signal output from the second transmission path coupler.

13. A method for controlling a wireless transmission system, the wireless transmission system comprising:

a first transmission path coupler including transmission lines configured to transmit a signal, one end of each of the transmission lines being connected to a send unit, another end of each of the transmission lines being connected to a terminating resistor, the first transmission path coupler being annularly disposed; and a second transmission path coupler including transmission lines configured to transmit a signal, one end of each of the transmission lines being connected to a comparator, another end of each of the transmission lines being connected to a terminating resistor, the second transmission path coupler being configured to be moved across a gap of the first transmission path coupler, the method comprising:

generating, by the second transmission path coupler, a first signal at timings corresponding to a rising edge and a falling edge of an input signal input to the first transmission path coupler in a case where the input signal is transmitted to a position at which the first transmission path coupler and the second transmission path coupler perform an electric field and/or magnetic field coupling, a signal width of the first signal being substantially in proportion to a length of the electric field and/or magnetic field coupling of the first transmission path coupler and the second transmission path coupler; and inputting the generated first signal to the comparator, wherein a value obtained by subtracting a transmission delay amount corresponding to the gap of the first transmission path coupler from the signal width of the first signal is substantially equal to or greater than a permissible jitter amount of a digital circuit configured to receive a signal output from the second transmission path coupler.

14. A non-transitory computer-readable storage medium storing instructions that, when executed by a computer, cause the computer to perform a method for controlling a wireless transmission system, the wireless transmission system comprising:
  a first transmission path coupler including transmission lines configured to transmit a signal, one end of each of the transmission lines being connected to a send unit, another end of each of the transmission lines being connected to a terminating resistor, the first transmission path coupler being annularly disposed; and
  a second transmission path coupler including transmission lines configured to transmit a signal, one end of each of the transmission lines being connected to a comparator, another end of each of the transmission lines being connected to a terminating resistor, the second transmission path coupler being configured to be moved across a gap of the first transmission path coupler, the method comprising:
generating, by the second transmission path coupler, a first signal at timings corresponding to a rising edge and a falling edge of an input signal input to the first transmission path coupler in a case where the input signal is transmitted to a position at which the first transmission path coupler and the second transmission path coupler perform an electric field and/or magnetic field coupling, a signal width of the first signal being substantially in proportion to a length of the electric field and/or magnetic field coupling of the first transmission path coupler and the second transmission path coupler; and
inputting the generated first signal to the comparator,
wherein a value obtained by subtracting a transmission delay amount corresponding to the gap of the first transmission path coupler from the signal width of the first signal is substantially equal to or greater than a permissible jitter amount of a digital circuit configured to receive a signal output from the second transmission path coupler.

* * * * *